Nov. 24, 1964
P. R. LUERTZING
3,158,276
CONTAINER WITH REMOVABLE AND REPLACEABLE
CLOSURE AND METHOD OF MAKING IT
Filed March 19, 1963
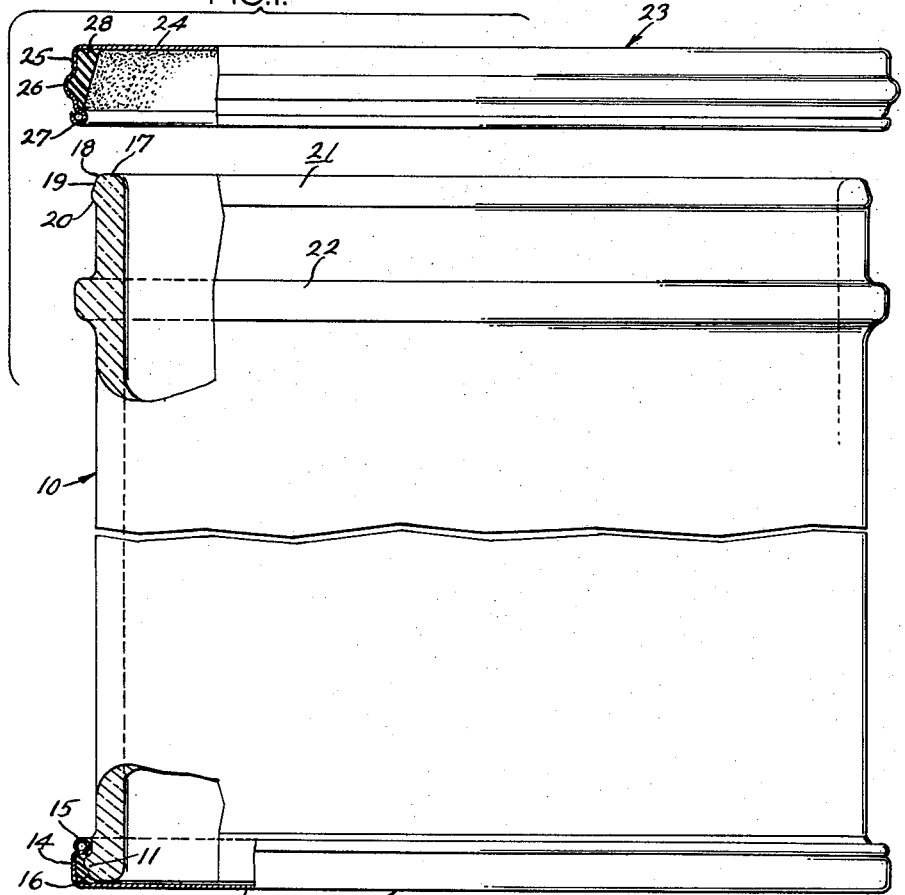
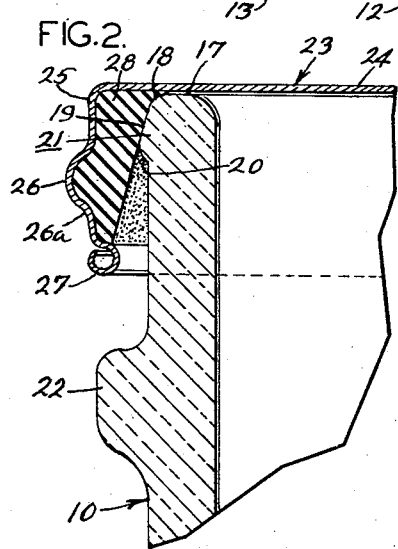
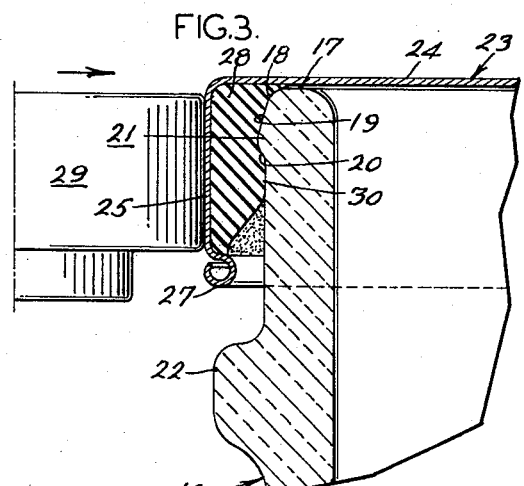
INVENTOR:
PAUL R. LUERTZING
BY
Howson & Howson
ATTYS.

United States Patent Office 3,158,276
Patented Nov. 24, 1964

3,158,276
CONTAINER WITH REMOVABLE AND REPLACEABLE CLOSURE AND METHOD OF MAKING IT
Paul R. Luertzing, Vineland, N.J., assignor to Luertzing Corporation, Vineland, N.J., a corporation of New Jersey
Filed Mar. 19, 1963, Ser. No. 266,415
2 Claims. (Cl. 215—40)

This invention relates to containers capable of being hermetically sealed and useful for the packing of food products, such as vegetables, fruits, etc. More particularly, the invention is concerned with a container having a novel closure capable of application to the container to effect a tight hermetic seal, the closure being readily removable to permit removal of the contents of the container and replaceable on the container to re-establish the seal. The invention also comprehends a method of forming the new closure, applying it to the container, and thereafter reforming it to final condition. The body of the new container is preferably made of glass, although resinous plastic materials having characteristics similar to those of glass may also be used for the purpose. As all the advantages of the invention are realized in a glass container, a form of such a container embodying the invention will be illustrated and described in detail for purposes of explanation.

Heretofore, many closures for hermetically sealing glass containers have been devised and such closures have commonly included a cap, frequently of sheet metal, which has a top panel intended to close the container opening and a skirt telescoping over the end or neck of the container. The desired seal between the closure of the container body is then effected by means of a gasket carried by a cap and held thereby in tight contact with a sealing surface on the container. In some cases, the gasket is in contact with an end surface of the container and is said to make a top seal, while, in other constructions, the sealing surface is generally conical and makes an angle of not more than 45° with the container axis, so that an angle seal is formed. A container having a substantially cylindrical sealing surface is said to have a side seal.

Closures having a top seal are ordinarily not satisfactory, if pressure is to develop within the container, because the sealing element lies between the top panel of the cap and the end of the container so that the pressure tends to bulge the top panel of the cap away from the sealing element. As a consequence, the seal between the sealing surface and the element is weakened and may be destroyed. Also, with a top seal, external pressure on the container closure such as would be caused by stacking cases holding the containers may cut the seal thereby permitting leakage from the container.

In Patent 2,708,050, of which I am one of the co-patentees, there is illustrated and described a container with a side seal closure which includes a cap having a circular top panel and a skirt. The sealing element is a body of flowable sealing compound which can be cured by heat to resilient condition and the sealing body occupies a space between the side seal surface of the container and an annular area on the inner surface of the top panel of the cap along the periphery of the panel and outwardly from the end surface of the container. The free edge of the skirt is formed into a bead and the cap is held in place by forcing the bead over spaced projections in a circumferential row about the container body. The closure of the patent is satisfactory for many purposes but it requires an amount of sealing compound which makes the closure more expensive than is permissible for a number of commercial uses. Also, it may be somewhat difficult to remove and replace the closure.

The present invention is, accordingly, directed to the provision of a container with an end opening and a novel closure for the container. The container and closure are so constructed that a combined angle and side seal is obtained but only a small amount of sealing material is required to form a tight hermetic seal. The angle seal in the container of the present invention is the primary seal while the side seal is merely of secondary interest as a seal. The primary function of the side seal is to hold the cap of the closure in place and, as a result, the new closure can be easily removed from the container and as easily replaced to re-establish the seal.

For a better understanding of the invention, reference may be made to the accompanying drawing, in which:

FIG. 1 is a view partly in elevation and partly in longitudinal section of a container with the closure detached therefrom;

FIG. 2 is a fragmentary longitudinal sectional view of the container of the invention with the closure in position on the container; and FIG. 3 is a view similar to FIG. 2 showing how the closure is reformed to establish the seal for the container opening.

The container illustrated comprises a body 10 which is formed of glass or a suitable plastic material and is generally cylindrical in form and open at both ends. The container body is formed at its bottom end with a finish which includes a circumferential rib 11, and this end of the container body is permanently closed by a closure which includes a metal cap 12 having a circular panel 13 which lies in close proximity with the bottom end of the container and is of greater diameter than the maximum diameter of the rib 11. The cap also includes a skirt 14 which telescopes over the finish and terminates in a bead 15 which lies adjacent the inner surface of the rib to prevent removal of the closure. The cap is sealed by a body 16 of a sealing compound which occupies the area between the panel 13 and the skirt 14 and is in contact with the body finish from the outer end of the body inward slightly beyond the rib.

At its upper end, the container body is formed with an end surface 17, which is substantially radial, and the body has an external finish lying adjacent to the end surface and including a curved surface 18 which leads inward from the outer end of the end surface to a frusto-conical sealing surface 19 lying at an angle of 30° or less and preferably 15° to the axis of the body. At the inner end of the frusto-conical surface, the finish includes a reversely curved surface 20, the outer section of which leads inwardly from the inner edge of the sealing surface and, with the latter, defines a circumferential rib 21. The inner section of the reversely curved surface joins the inner edge of the outer section to the surface of the container body inward from the finish. The container may advantageously include a circumferential rib 22 spaced inward from the finish and useful as a fulcrum i˙ the removal of the closure.

The closure 23 of the container includes a cap, which may be made of metal and is formed of a circular top panel 24 of a diameter greater than the maximum diameter of the rib 21. A cylindrical skirt 25 is connected to the peripheral edge of the panel and is formed with an outwardly projecting circumferential channel 26 which is open to the interior of the skirt and has a width such that its lower margin 26a lies spaced from the panel 24 a distance greater than that from the top surface of the container to the inner end of the reversely curved surface 20. The free edge of the skirt beyond the channel is curled to form a bead 27 which preferably lies substantially entirely within the prolongation of the cylindrical surface of the skirt.

The closure is completed by a body 28 of sealing material which is affixed to an annular area of the panel 23 lying adjacent to its periphery and having an inner diameter not substantially less than the outer diameter of the end surface 17 on the container body. The sealing material adheres to the inner surface of the skirt 25, including the surface of the channel, and the sealing material occupies the area defined by the skirt and the panel and extends to the inner edge of the bead. The sealing body tapers in cross section from the panel 24 to the bead 27 as illustrated in FIG. 1. The sealing material is preferably a suitable latex which can be caused to flow into position and is then cured so that it becomes resilient. The latex chosen for the purpose is one which, when in cured condition, does not lose its resiliency when exposed to temperatures, such as 250° F., at which foods are sometimes processed. Latices fulfilling the requirement stated are commercially available.

In applying the closure to the container after the latter has been filled, the cap, in the form shown in FIGS. 1 and 2, is placed on the open end of the container with the panel 24 resting upon the end surface 17, so that substantially none of the sealing material overlies the end surface. In this position of the cap, the body of sealing material rests in contact with the conical sealing surface 19 and the major part of the channel 26 lies below a horizontal plane through the rib 21 at the maximum diameter of the latter. The cap is then held in position and the skirt 25 is reformed by pressure applied for example, by means of a rotating wheel 29, which is forced against the channel and flattens it so that the skirt becomes cylindrical and the channel disappears. The reformation of the skirt as described causes the material in a zone of the body between its ends to flow inwardly into tight contact with the reversely curved surface 20 and with the cylindrical surface of the body inward from the reversely curved surface, so that both an angle seal and a side seal are formed. The closure includes no top seal since no substantial part of the sealing body lies between the end surface 17 on the container and the inner surface of the top panel 24 of the cap. As the skirt retains its new shape permanently, the zone of the body forced inwardly by the reforming operation becomes a permanent resilient internal rib 30 on the skirt which is of less inner diameter than the outer diameter of the rib 21 of the finish. The rib 30 underlies the rib 21 of the finish and acts to hold the closure tightly in place with the side seal providing additional friction to further hold the closure in place.

After the application of the closure as described, it can be readily removed from the container by being pried loose by a knife blade or other implement seated on the outer surface of the container bead 22 as a fulcrum and pressed outwardly against the bead 27 on the skirt. In the removal of the closure, the body of sealing material is distorted as it passes beyond the rib 21 but, when the closure is free of the container, the body of sealing material resumes its original condition, in which it includes the rib 30. When it is desired to close the container again, the cap is placed upon the open end of the container and forced inwardly. As the cap moves toward the end of the container body, the body of sealing material is distorted as its rib 30 passes beyond the rib 21 of the container finish. The application of pressure to the cap is continued until the panel 24 engages the end and rests in contact with the end surface of the container. When the closure is in this position, the internal rib 30 of sealing material lies wholly inward of the rib 21 of the finish and the body of sealing material bears tightly against the conical surface 19, the reversely curved surface 20, and the outer surface of the container, so that the angle and side seals are re-established and the closure is held firmly in place.

While a particular embodiment of the present invention has been illustrated and described herein, it is not intended to limit the invention to such a disclosure and changes and modifications may be incorporated therein within the scope of the following claims.

I claim:

1. A container comprising a body having an end opening with an end surface encircling the opening and an exterior finish lying adjacent to the end surface and including a circumferential rib lying inward from the end surface, a closure for the opening of the body formed of a metallic cap having a circular panel of a diameter greater than the maximum diameter of the rib and lying in close proximity to and spaced from the end surface of the container and a cylindrical skirt connected to the peripheral edge of the panel and extending coaxially of the container, the skirt being formed with a deformable outwardly projecting circumferential zone defining a channel open to the interior of the skirt and extending inwardly beyond the rib, said skirt having its inner edge out of contact with the surface of the body and lying inward a substantial distance from the rib, and a resilient sealing body adhering to the inner surface of the panel over an annular area adjacent to the periphery of the panel and substantially entirely outwardly from the end surface of the container, the sealing body occupying the area defined by the panel and the skirt and filling the channel and adhering to the inner surface of the skirt, including the channel, from the panel to the upper end of the bead, the sealing body tapering in cross-section from the panel to the bead said circumferential zone of the skirt adapted to be displaced radially inwardly to press the sealing body against the exterior finish of the container including the circumferential rib of the container to provide an effective seal therebetween.

2. A closure member adapted to overlie and close the open end of a container having an exterior finish adjacent to the open end thereof comprising; a generally circular panel, a cylindrical skirt connected to the peripheral edge of the panel and adapted to extend coaxially of the container, said cylindrical skirt having between its opposite edges thereof a deformable outwardly projecting circumferential zone defining a channel opening to the interior of the skirt, and a resilient sealing body adhered to the inner surface of the panel over an annular area adjacent to the periphery of the panel and adhered to the inner surface of said skirt from the edge of said skirt adjacent said panel to a point on said skirt beyond said channel in a direction extending away from said panel, said sealing body completely filling said channel and tapering in cross-section from the panel to its terminal end remote from said panel said circumferential zone of the skirt adapted to be displaced radially inwardly to press the sealing body against the exterior finish of the container to provide an effective seal therebetween.

References Cited in the file of this patent

FOREIGN PATENTS 568,270   Belgium _____ Oct. 1, 1958